United States Patent [19]

Brookner et al.

[11] 4,025,921
[45] May 24, 1977

[54] TECHNIQUE FOR OBTAINING WIDE BANDWIDTH WITH OPTICALLY FED ARRAY

[75] Inventors: Eli Brookner, Lexington; Wilfred F. Leach, Chelmsford, both of Mass.

[73] Assignee: The United States of America as represented by the Secretary of the Army, Washington, D.C.

[22] Filed: Nov. 19, 1975

[21] Appl. No.: 633,354

[52] U.S. Cl. .......................... 343/5 R; 343/100 SA
[51] Int. Cl.² .......................................... G01S 9/02
[58] Field of Search ...................... 343/5 R, 100 SA

[56] References Cited

UNITED STATES PATENTS

| | | |
|---|---|---|
| 3,243,804 | 3/1966 | Smith, Jr. .................... 343/16 M X |
| 3,245,081 | 4/1966 | McFarland .............. 343/100 SA X |
| 3,517,389 | 6/1970 | Dausin ......................... 343/100 SA |
| 3,568,184 | 3/1971 | Drabowitch ...................... 343/5 R |
| 3,815,134 | 6/1974 | Jones ............................. 343/5 R X |
| 3,914,765 | 10/1975 | Litt et al. ................. 343/100 SA X |

Primary Examiner—T.H. Tubbesing
Attorney, Agent, or Firm—William G. Gapcynski; Lawrence A. Neureither; Robert C. Sims

[57] ABSTRACT

An optically fed lens array radar system is provided with an on boresight feed and a plurality of off boresight feeds. When looking far enough off boresight, one switches from the on boresight feed to the appropriate off boresight feed. The off boresight feeds simultaneously cover a large scan angle and achieve with the on boresight a large bandwidth over the largest scan angle of interest.

1 Claim, 13 Drawing Figures

$$T = \frac{D \sin \theta_s}{C}$$

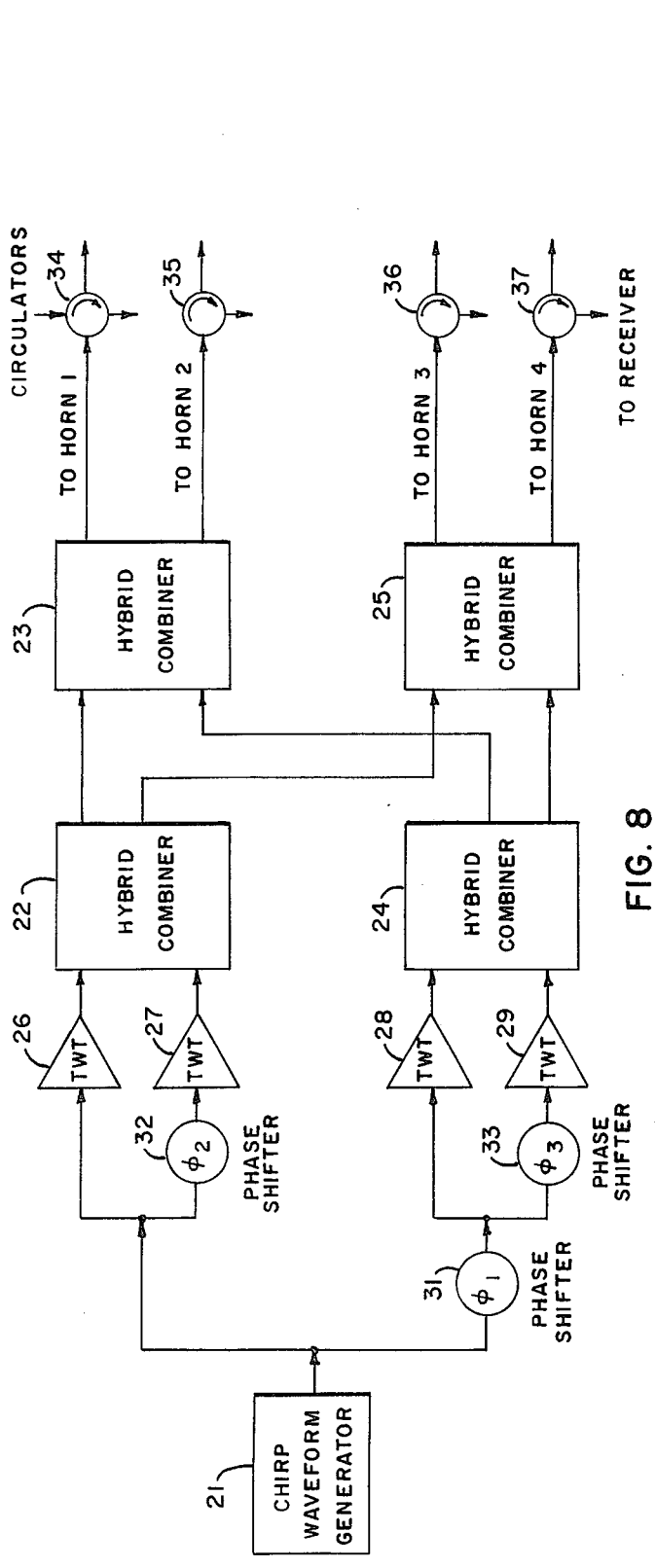
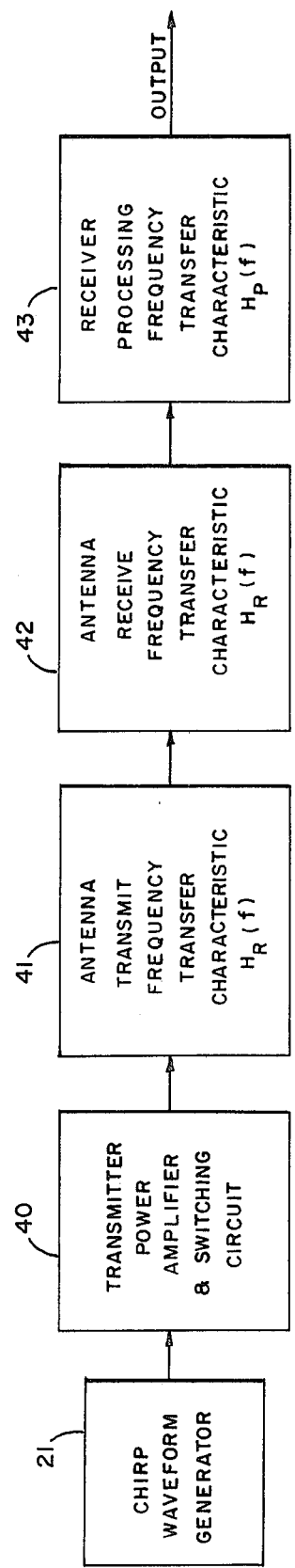
FIG. 8
FIG. 9

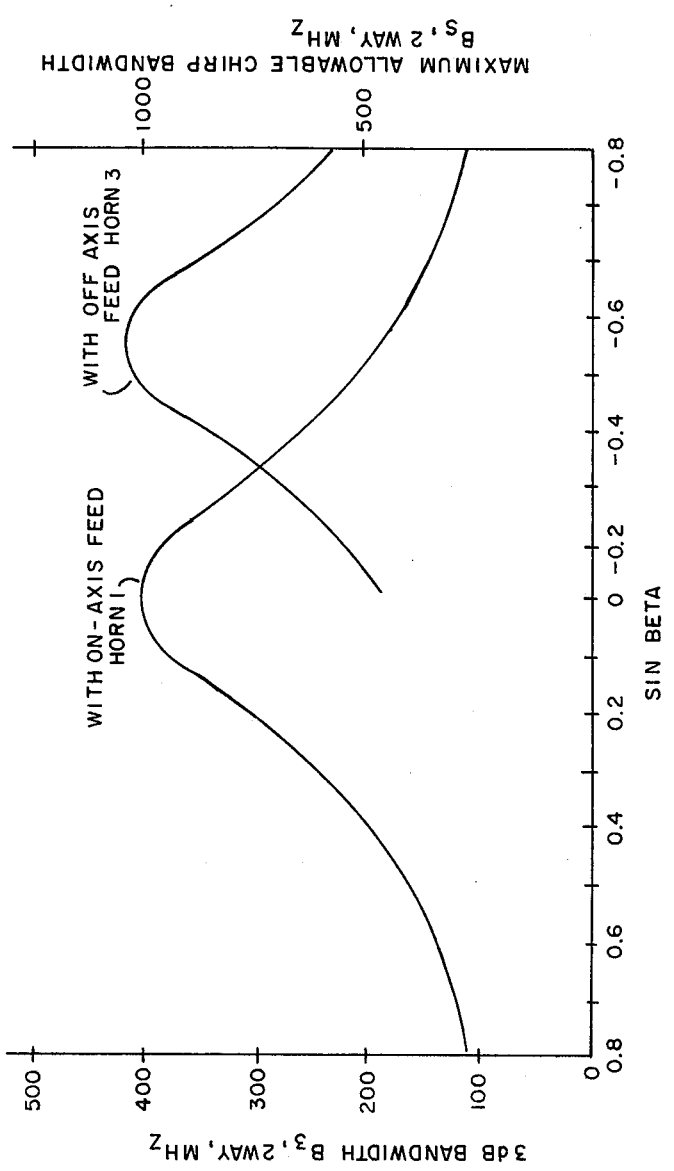

TECHNIQUE FOR OBTAINING WIDE BANDWIDTH WITH OPTICALLY FED ARRAY

BRIEF DESCRIPTION OF THE DRAWINGS

FIG. 8 is a block diagram of the switching system;
FIG. 9 shows the frequency transfer characteristics of the antenna and switching system;
FIG. 11 is a graph showing the bandwidths for two different feeds.

DESCRIPTION OF THE PREFERRED EMBODIMENTS

Figure 1:
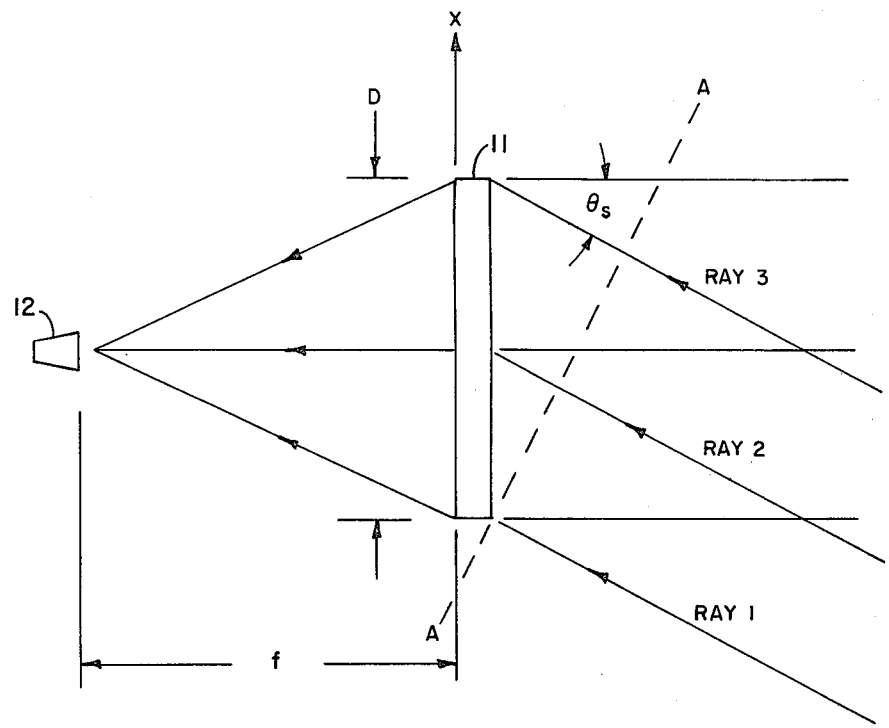
FIG. 1 depicts a linear optically fed array.
Figure 2:
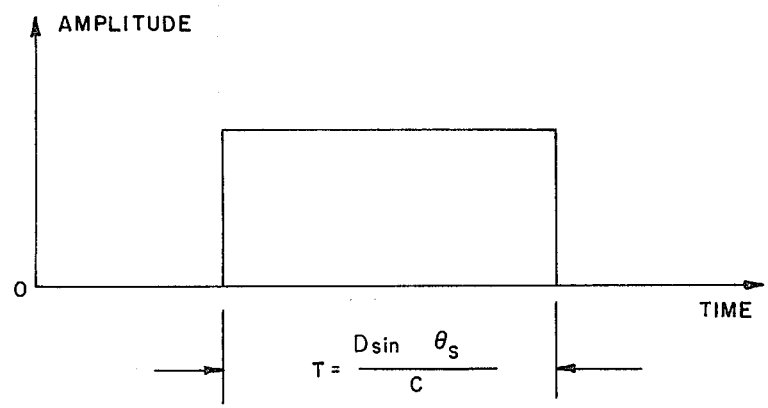
FIG. 2 shows the transient response of the uniformly weighted linear optically fed array shown in FIG. 1.
Figure 3:
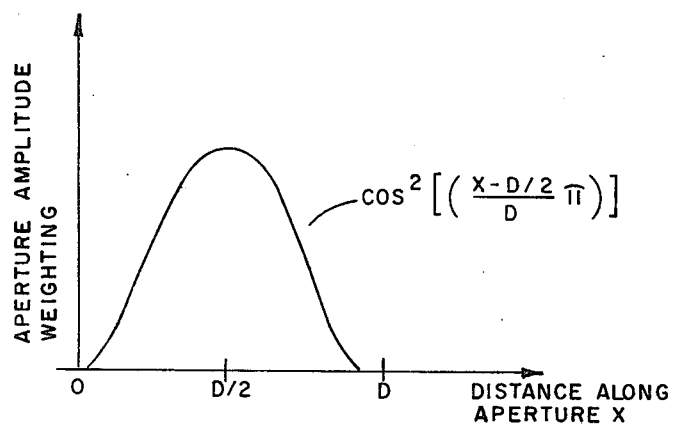
FIG. 3 shows the cosine squared aperture weighting.

FIG. 1 shows a simple optically fed lens type array system. For simplicity of discussion it is assumed initially that the antenna 11 is made up of a linear array. It is apparent that the different rays (such as rays 1, 2 and 3) take different times to propagate from the wavefront position A—A to the primary feed 12. The larger the angle off boresight the greater the difference in the time it takes rays 1 and 3 to reach the focal point. Pat. No. 3,305,867 to Miccioli et al. shows a similar system having the same drawbacks to its operation. The transient response of the antenna for an impulse arriving from infinity at an angle $\theta_s$ is depicted in FIG. 2 for $f/D >> 1$ where D is the antenna length and $f$ is the distance of the primary feed from the antenna array center. As is indicated, the width of the response is proportional to $D \sin\theta_s )/c$ where $c$ is the velocity of light and $\theta_s$ is the angle of arrival of the wavefront. Assume a cosine squared weighting over the aperture, then the response of the antenna is given as shown in FIG. 3.

Frequency transfer characteristics of the antenna have to be considered. If the same antenna is used for transmission and reception, a signal will pass though the antenna twice so that it will have a total frequency transfer characteristic given by the square of that antenna's characteristic.

Assume a radar system which transmits a chirped signal. Normally a weighting is applied in the receiver to the echo signal to obtain low range sidelobes. Either time or frequency weighting is used. The antenna frequency transfer characteristics can be used instead to achieve this weighting. Examination of the square of the magnitude of the frequency transfer characteristic designated as $|H(f)|^2$ indicates that for frequencies out to $|H(f)|^2 = 0.107$ one obtains a good approximation to the 40 dB Taylor frequency weighting needed. Hence the weighting can be done by the antenna. The $|H(f)|^2 = 0.107$ bandwidth is $$B_s = \frac{2.5}{T} = \frac{2.5c}{D \sin\theta_s} \quad \text{A}$$

Let $D = 10$ ft, $\theta_s = 45°$, then $B_s = 350$ MHz. Then a chirp waveform having a 350 MHz bandwidth can be supported by the system if all the pulse compression weighting is in the antenna. In principle some of the weighting would be done in the receiver. Typically, for example, if a bandwidth of only 250 MHz is needed then the remaining weighting would be done in the receiver.

Equation A indicates an infinite $B_s$ on boresight, that is, for $\theta_s = 0$. Actually due to the fact that $f/D$ is finite, $B_s$ in finite on boresight.

In some instances, a large bandwidth is needed off boresight — a bandwidth of 500 MHz. The method hereafter disclosed for achieving such an improvement in the bandwidth off boresight is to use an off boresight feed in addition to the on boresight feed. When looking far enough off boresight one switches from the on boresight feed to the appropriate off boresight feed.

Figure 4:
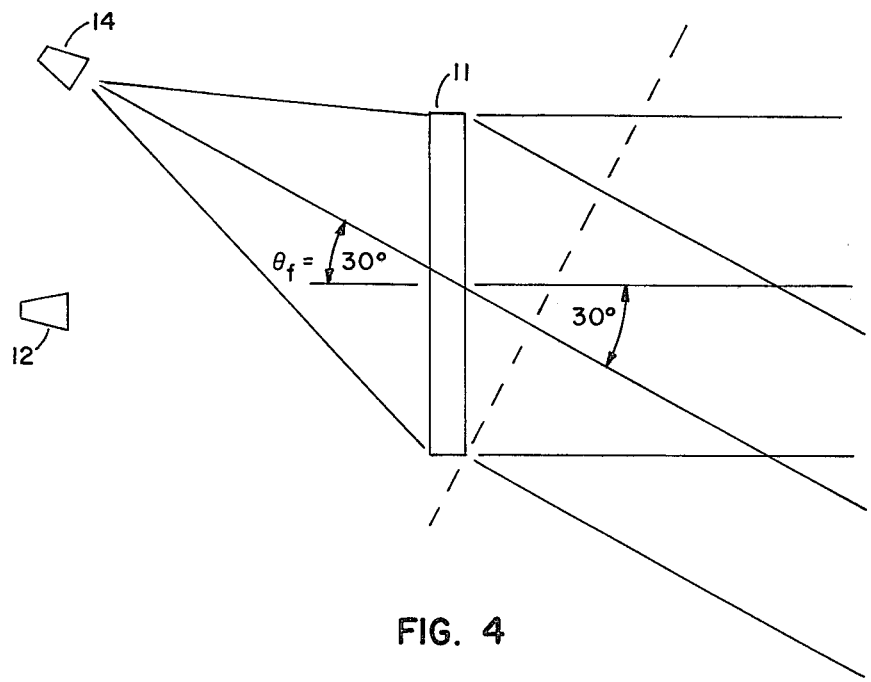
FIG. 4 shows the depiction of an off boresight feed.

For example, assume that one has a feed 14 placed at an offset angle of $\theta_f = 30°$ as shown in FIG. 4. Assume an impulse coming in at an angle $\theta_s$ and $f/D >> 1$. For these assumptions the width of the received impulse response is given by $$T = \frac{|D \sin\theta_s - D \sin\theta_f|}{c} \quad \text{B}$$

and $$B_s = \frac{2.5c}{D |\sin\theta_s - \sin\theta_f|} \quad \text{C}$$

Assume that it is desired that $B_s$ be twice as large for $\theta_s = 45°$ when $\theta_F \neq 0$ when $\theta_f = 0$. The question is what $\theta_f$ must be used? Answer $\theta_f = 20.7°$ and $f/D >> 1$ since $|\sin\theta_s - \sin\theta_f| = 0.707/2 = 0.353 \sin 45° - \sin\theta_f =$
$0.353 \sin\theta_f = 0.707 - 0.353 = 0.353 \theta_f = 20.7°$ for
$f/D >> 1$.

For $\theta_s = 20.7°$, $B_s$ is limited by the $f/D$ used. When the primary feed on boresight is also being used, the antenna will have its maximum bandwidth at $\theta_s = 0°$ and $\theta_s = 20.7°$. When looking within $\pm 10°$ of the antenna boresight, the on boresight feed is used for transmission and reception; when looking at angles greater than $+10°$ the off boresight feed at $\theta_s = 20.7°$ would be used. A number of off boresight feeds would be used to simultaneously cover a large scan angle and at the same time achieve a large bandwidth over the coverage angle of interest.

Figure 5:
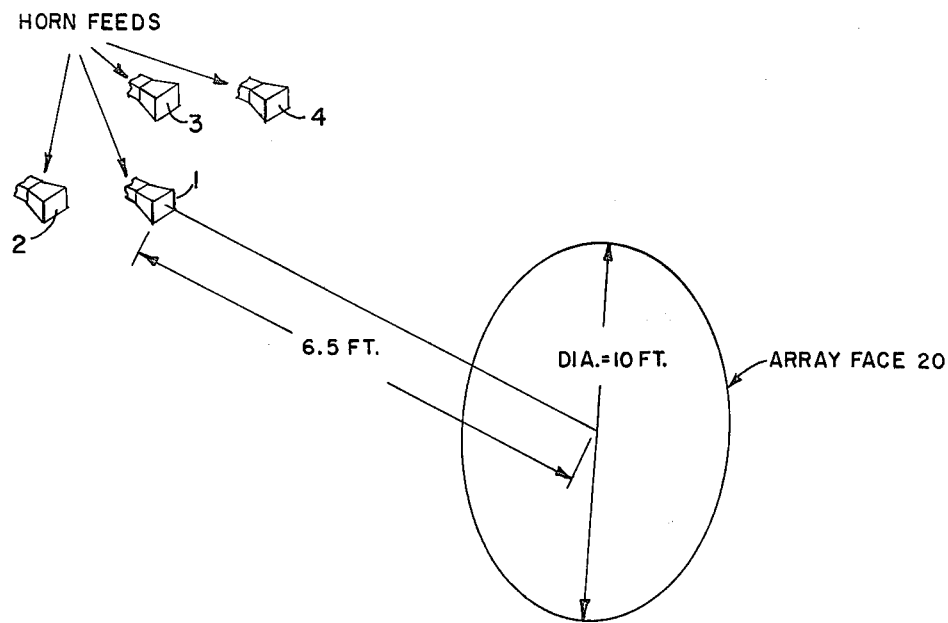
FIG. 5 shows antenna system utilizing the present invention.

In the above a linear array was assumed. Assume now a space fed circular array. For this case a number of primary feedhorns would be utilized to cover the solid angle of interest. The preferred configuration is shown in FIG. 5. The preferred configuration geometry of the array face 20 is given for the case of a 10 ft. diameter circular aperture having a focal number of 0.65 (for which the focal length is 6.5 ft. ). The radar carrier frequency is assumed to be 4500 MHz (hence $\mu = 0.203$ ft.). As is illustrated in FIG. 5, the antenna system consists of a four-horn feed with the horns designated as horn 1, 2, 3 and 4. A cosine antenna aperture illumination is assumed. That is, the illumination over the aperture is proportional to $\cos(\pi R/10)$ where R is the radial distance from the center of the aperture in feet.

Each horn provides an angular region of space over which a chirp signal bandwidth of 617 MHz can be used. These solid angles of space are defined by the circular coverage regions in $\sin\alpha - \sin\beta$ space shown in FIG. 6. The angles $\alpha$ and $\beta$ are defined in FIG. 7. In FIG. 7 the $x$ and $y$ rectangular coordinates are in the plane of the antenna aperture while the $z$ axis is perpendicular to the antenna aperture plane. The origin of the rectangular and spherical coordinates shown in FIG. 7 is placed at the center of the array face. Note that $$\sin\alpha = \sin\theta \cos\phi \quad (1a)$$
$$\sin\beta = \sin\theta \sin\phi \quad (1b)$$

where $\theta$ and $\phi$ aree the spherical coordinates indicated in FIG. 7. From (1a) and (1b) one can write $\theta$ and $\phi$ in terms of $\alpha$ and $\beta$ as:

$$\theta = \arcsin\sqrt{\sin^2\alpha + \sin^2\beta} \quad (2a)$$
$$\phi = \arctan(\sin\beta/\sin\alpha) \quad (2b)$$

Figure 6:
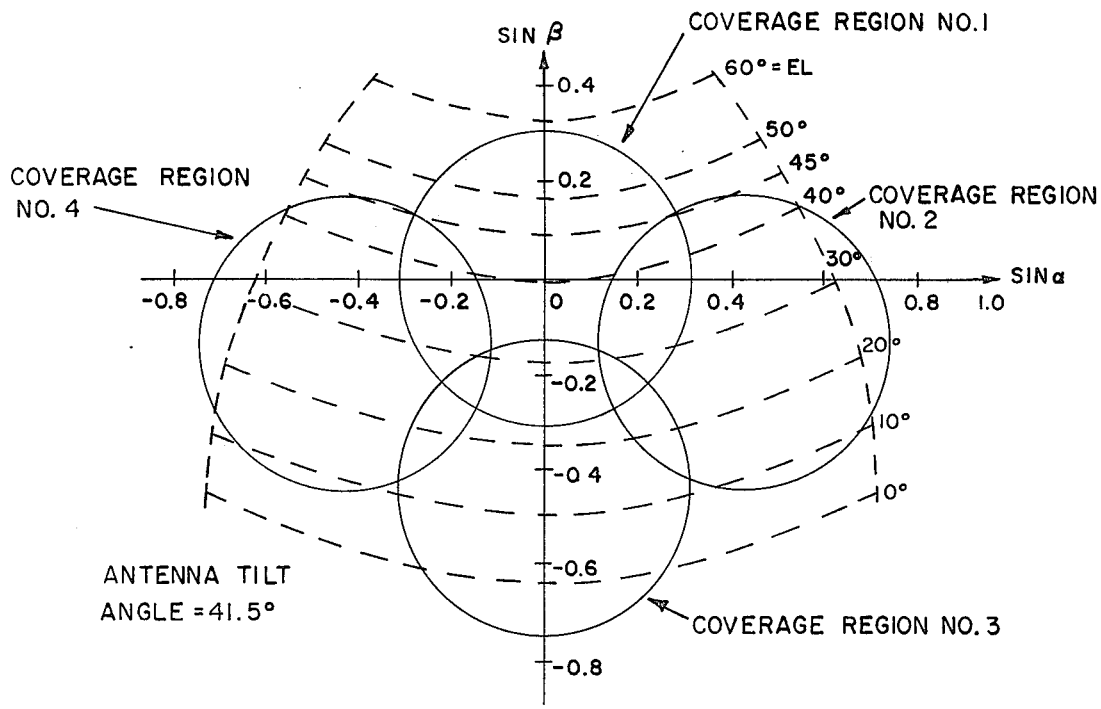
FIG. 6 is a diagram showing the coverage regions of the system depicted in FIG. 5.
Figure 7:
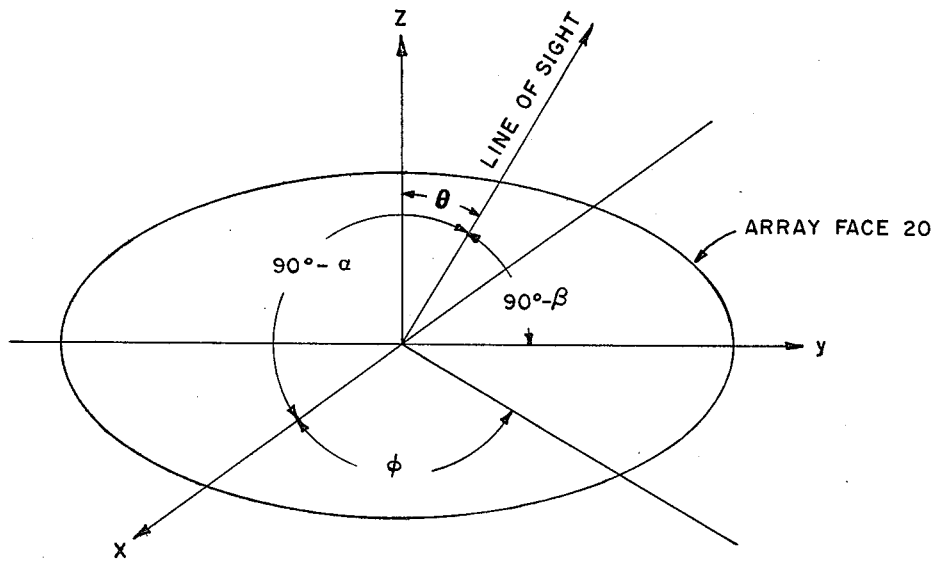
FIG. 7 shows the coordinate system.

For the results shown in FIG. 6 the antenna face was assumed to be tilted back 41.5°.

The transmitted signal is radiated from the horn which provides 617 MHz coverage for the specific region in which the beam is to be pointed. For example, if one wants to radiate at an angle within the circular Coverage Region No. 1, horn 1 is used; if an angle within the circular Coverage Region No. 2 is to be utilized then horn No. 2 is used; etc. If one had only a single horn for the system, then the 617 MHz coverage region of that single horn would only be achieved. For example, if only horn 1 were used then the 617 MHz bandwidth would be achieved in circular Coverage Region No. 1 of FIG. 6.

A preferred configuration for switching the transmitted power of chirp waveform generator 21 from one horn to another, depending on which region of space is to be covered at any one instant, is given in FIG. 8. The means for switching used four hybrid combiners 22–25, four TWT power amplifiers 26–29, three phase shifters 31–33, and circulators 34–37. Each TWT is assumed to generate the same peak power. The power from the four TWT's will be combined and radiated either from horn 1, 2, 3, or 4 depending on which of the phase shifts indicated in Table 1 is used.

TABLE I

| Phase Shifter Phase (deg) | | | |
|---|---|---|---|
| Phase Shifter No. 1 | Phase Shifter No. 2 | Phase Shifter No. 3 | Horn Fed |
| 0 | 0 | 0 | 1 |
| 180 | 0 | 0 | 2 |
| 0 | 180 | 180 | 3 |
| 180 | 180 | 180 | 4 |

By using phase shifts other than those indicated in Table 1, it is possible to radiate simultaneously in more than one direction. For example, by having phase shifter 31 be 90° while phase shifters No. 32 and 33 are set at 0, one has half the transmitted power radiated simultaneously to horns 1 and 2. Having phase shifter No. 31 set at a phase shift $\theta_1$ (while the other two phase shifters are set at 0 phase shift) will result in the power radiated from horns 1 and 2 be respectively given by $$P_1 = \tfrac{1}{2}P = \tfrac{1}{2}P \cos\theta_1 \quad (3a)$$

$$P_2 = \tfrac{1}{2}P - \tfrac{1}{2}P \cos\theta_1 \quad (3b)$$

where $P/4$ is the peak power generated by each TWT. By appropriately setting the phase shifts for phase shifters 1, 2, and 3 it should be apparent that it is possible to simultaneously transmit beams from the four horns with the total power being arbitrarily divided among the horns. Magic T's could be used in place of the hybrid combiners. Also, mechanical switching means could be used for switching the power between the horns.

It is important to define clearly what is meant by a 617 MHz coverage region. Specifically, a resolution is achieved in each one of 617 MHz coverage regions shown in FIG. 6 which is equal to that which would be achieved if one transmits a chirp waveform having a swept bandwidth $B_s$ of 617 MHz, and if one uses at the same time a frequency weighting giving a 40 dB Taylor weighting. This resolution is achieved within each of the circular regions shown in FIG. 6. The resulting 3 dB width of the received compressed pulse is 1.00 ft.

To achieve the above resolution for the configuration shown in FIG. 5, a chirp waveform having a 617 MHz swept bandwidth $B_s$ is generated by a transmitter and radiated by the appropriate horn. This chirp waveform is generated using any one of the standard techniques known in the art.

The 40 dB Taylor weighting for the antenna system of FIG. 5 being disclosed is achieved partly by the transmit and receive frequency transfer characteristics of the antenna and partly by the receiver processing frequency transfer characteristics; see FIG. 9. The generator 21 and the transmitter power amplifier and switching circuit 40 provide $S_T(f)$ which is the spectrum of unweighted chirp waveform generated which equals rect $$\frac{f - (B_s/2)}{B_s}.$$

The antenna transmit, receive and receiver processing transfer characteristics combine to produce $H_{TAY} = H_T(f) H_R(f) H_P(f)$. Since $H_T(f) = H_R(f)$; $H_{TAY} = H_T^2(f) H_P(f)$. Therefore the final output $S_R(f)$ will be $H_{TAY}(f) S_T(f)$.

The degree of weighting achieved in the antenna depends on how close one is to the 617 MHz contours indicated in FIG. 6. When one is radiating from horn 1 in a direction along the 617 MHz contour of circular Coverage Region No. 1, then practically no weighting is needed in the receiver. When one is pointing in a direction corresponding to the center of this circular coverage region, then practically all of the 40 dB Taylor weighting is obtained by the receiver processing. The receiver processing is thus programmed to give a frequency weighting depending on the antenna beam pointing direction. Specifically, its weighting is adjusted so that the product of the transmit and receiver antenna frequency transfer characteristics with that of the receiver processing frequency transfer characteristic equals the frequency weighting needed for 40 dB Taylor weighting.

Figure 10:
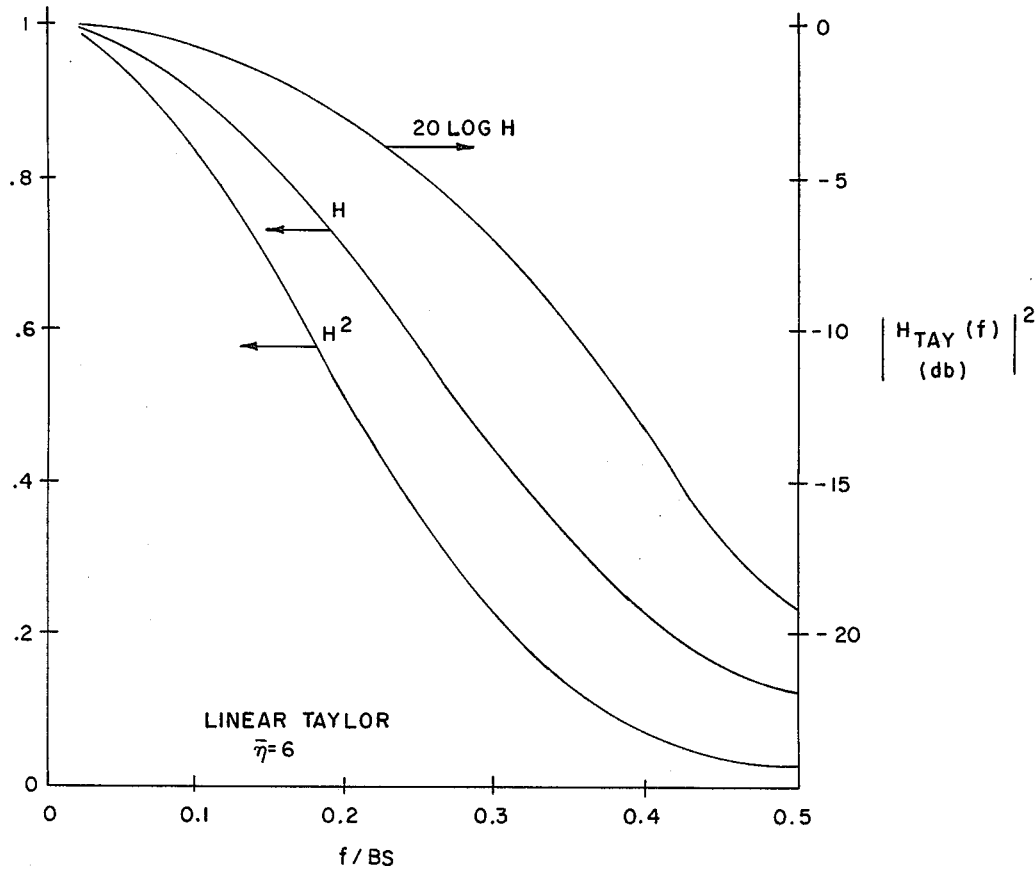
FIG. 10 is a graph showing the frequency transfer characteristics.

FIG. 10 shows the required frequency transfer characteristic $H_{TAY}(f)$ needed for a 40 dB Taylor weighting. From FIG. 10 it is seen that the three dB bandwidth $B3 = 0.405 B_s$. Hence, the 3 dB bandwidth $B_3$ is 250 MHz when $B_s = 617$ MHz. Moreover, the three dB bandwidth of the product of the antenna transmit and receive frequency characteristic is 250 MHz along the contour of Coverage Region No. 1 for horn 1.

FIG. 11 shows the maximum bandwidths $B_3$ and $B_s$ achievable along the sin$\beta$ axis (i.e., sin $\alpha = 0$) for horns 1 and 3. It is noted that these bandwidths are larger inside the circular coverage regions, reaching a maximum of $B_3 = 400$ MHz and $B_s = 988$ MHz at boresight for the horn 1. When obtaining the maximum available $B_s$ and $B_3$, practically all the weighting is done by the antenna, that is, $$H_3^2(f) = H_{TAY}(f). \quad (4)$$

The axis of horn 1 is placed on the negative z axis. The axis of horn 3 is placed along a line through the array center which is defined by the angles $\theta = 30°$, $\phi = -90°$ in FIG. 7. Note that the maximum bandwidth for horn 3 is not obtained in the direction of the 3rd horn, it occurring at sin$\beta = (\beta = 26.7°)$ and $0 \propto = 0°$ instead of at sin$\beta = 0.5$ ($\beta = 30°$) with $\alpha = 0°$.

The other horns are positioned as shown in FIG. 5. All the horns are located at the same distance away from the center of the array face, that is 6.5 ft. from the array center. The axes of all the horns are located on lines passing through the center of the array face. Except for horn 1, the direction of the axis of a horn is not equal to the direction specified by the center of circular coverage region for that direction specified by the center of circular coverage region for that horn. The directions of the axes of horns 1 and 3 were specified above. The axes of horn numbers 2 and 4 also pass through the array face center and also make angles $\theta = 30°$ with respect to the array normal. However, for horns 4 and 2, $\phi = 180° + 18.6°$ and $- 18.6°$ respectively. Using equations (1a) and (1b), the positions of the horns in terms of sin $\alpha - \beta$sin and $\alpha - \beta$ coordinates can be obtained.

Figure 12:
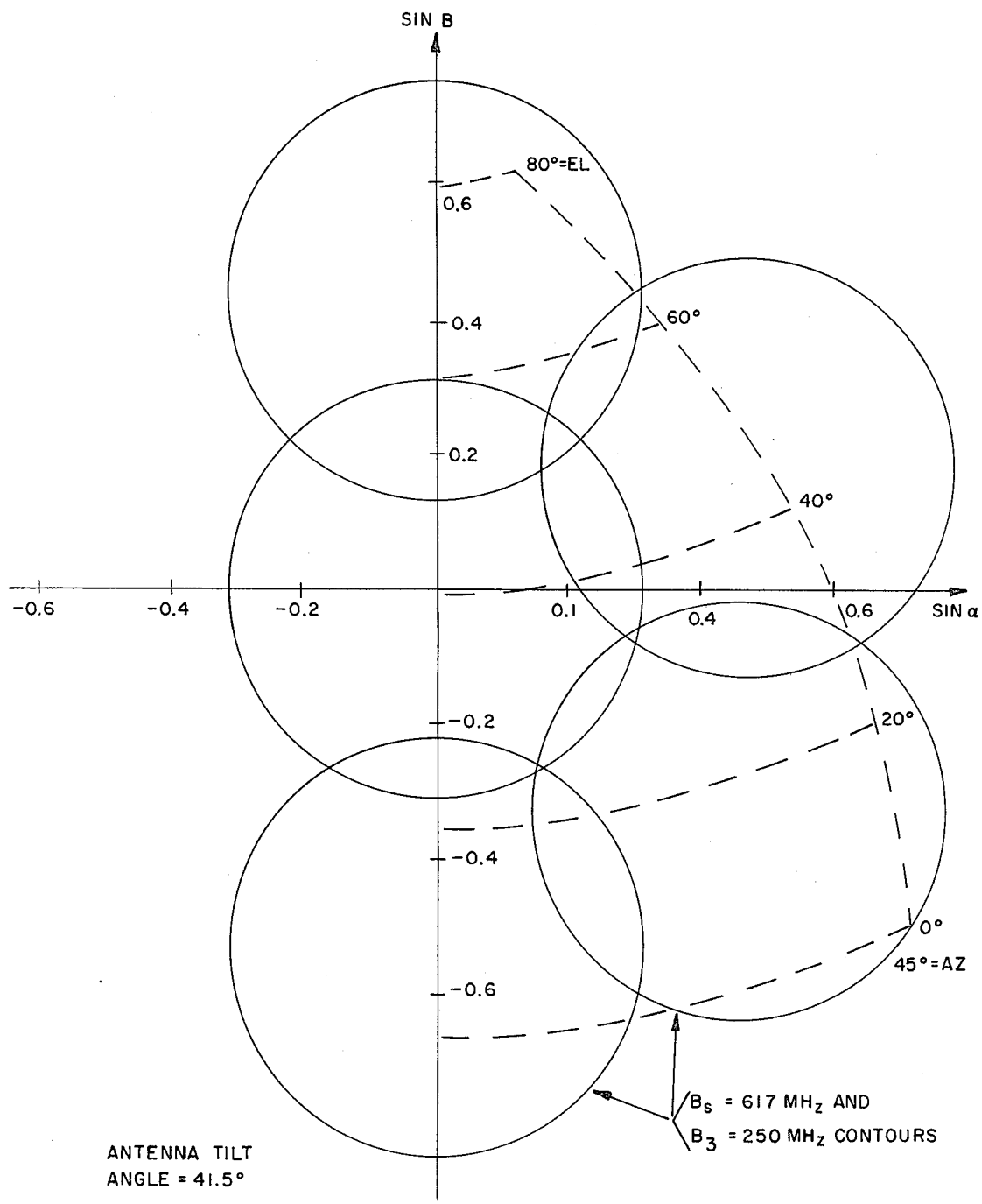
FIG. 12 shows the bandwith coverage for a seven horn feed system.
Figure 13:
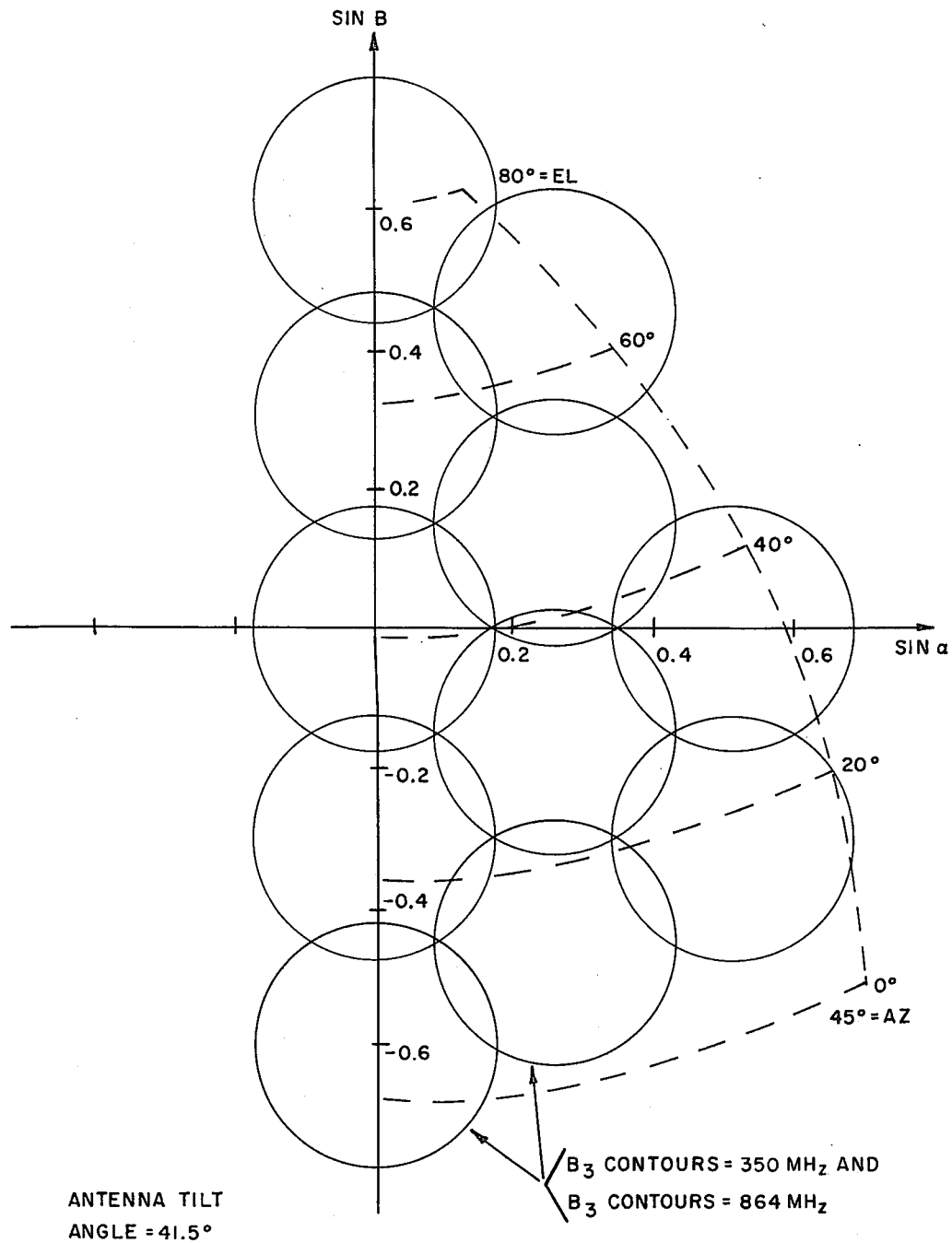
FIG. 13 shows the bandwidth coverage of a 17 horn feed system.

Although the results are given for the spherical geometry of FIG. 5 together with its assumed parameters, it should be apparent that the results hold as well for other geometries, carrier frequencies, and antenna sizes. The positions of the horns can be varied to alter the coverage regions. The number of horns can be increased to obtain either a larger region over which the wider bandwidth coverage is achieved or else to achieve a wider bandwidth over a given specified coverage region. FIG. 12 shows the $B_s = 617$ MHz Coverage Region for the antenna of FIG. 5 when a seven horn feed is used. FIG. 13 shows the $B_s = 864$ MHz Coverage Region obtained for the antenna system of FIG. 5 when a seventeen horn feed is used. The horns of FIGS. 12 and 13 are located symmetrically about the sin$\beta$ axis and hence only the coverage regions of those to the right of the sin$\beta$ axis are shown.

Although simple horns are shown in FIG. 5, monopulse horns or other complex feed horns could be used in place of the simple horns depicted. Waveforms other than a chirp waveform can be transmitted. The important thing is that a specified wide bandwidth waveform can be transmitted over the regions covered by various horn feeds rather than over the region covered by only one horn feed. As indicated before, for the configuration of FIG. 5 the 3 dB banwidth of the antenna transmit times receiver frequency transfer characteristic is 250 MHz along the coverage region contours, and larger inside these regions. Frequency weighting other than that of a 40 dB Taylor weighting can be implemented (e.g., a Hamming weighting or a cosine weighting) by appropriately programming the receiver processor. The illumination over the aperture can be other than cos ($\pi R/10$), e.g. a circular Taylor or truncated Gaussian illumination.

We claim:

1. In an optically fed array antenna system having a receiver processor and at least one feed located on the boresight of the system the method comprising the steps of:

providing a plurality of off boresight feeds located off boresight;

when the antenna system is directed far enough off boresight, switching from the feed on the boresight to an appropriate feed off boresight;

arranging the location of each feed so they each cover different angular regions of space;

switching the transmitted power from one feed to another depending upon which region of space is selected to be covered;

selectively providing transmitted power to different feeds simultaneously; and providing frequency weighting depending upon the region of space selected to be covered.

* * * * *